April 29, 1958     K. H. BECK     2,832,946
CONTROL APPARATUS

Filed Feb. 14, 1956     2 Sheets-Sheet 1

*INVENTOR.*
KENNETH H. BECK

BY
ATTORNEY.

April 29, 1958     K. H. BECK     2,832,946
CONTROL APPARATUS

Filed Feb. 14, 1956     2 Sheets-Sheet 2

*INVENTOR.*
KENNETH H. BECK

BY
ATTORNEY.

United States Patent Office 2,832,946
Patented Apr. 29, 1958

2,832,946

CONTROL APPARATUS

Kenneth H. Beck, Newtown, Pa., assignor to Minneapolis-Honeywell Regulator Company, Minneapolis, Minn., a corporation of Delaware Application February 14, 1956, Serial No. 565,398

12 Claims. (Cl. 340—213)

A general object of the present invention is to provide a new and improved control apparatus. More specifically, the present invention relates to an electrical bridge circuit designed for use in control apparatus and characterized by its ability to fail safe.

Any control apparatus which is depended upon to perform automatically a control function, to be acceptable, must be adapted to operate in such a manner that upon the failure of any component, the controller will operate in such a manner that it will prevent the controlled variable from assuming an unsafe condition.

It is, therefore, a specific object of the present invention to provide a new and improved electrical bridge circuit for use in control apparatus which includes special circuitry adapted to provide safe failure upon the failure of any of the components thereof.

Another specific object of the present invention is to provide a new and improved electrical bridge circuit which is particularly adapted for use with thermistors or other non-linear temperature sensing elements.

The resistance of a thermistor decreases exponentially with increasing temperature. Accordingly, when a thermistor is employed as a temperature sensing element in a bridge circuit, it is generally shunted with another resistor to linearize the bridge output over the bridge operating range. When such a shunt is employed, however, the safe failure characteristics of the bridge are diminished. For example, an opening of either the thermistor or the shunt will cause the bridge output signal to reflect the resistance of the other element which would not be indicative of the temperature being sensed.

It is therefore another specific object of the present invention to provide in an A. C. bridge circuit a D. C. path including the thermistor temperature sensing element and substantially all of the bridge circuit with means connected in that path to detect an open thermistor.

A further object of the present invention is to provide in a control apparatus a bridge circuit which is interconnected with the amplifier employed to amplify the bridge output signal in a manner to provide additional safe failure characteristics.

A still further object of the present invention is to provide in a control apparatus circuitry which permits the bias circuit of the active element employed in the first stage of the bridge output amplifier to be connected to the amplifier energizing source through the resistor employed to shunt the bridge temperature sensing element.

The various features of novelty which characterize this invention are pointed out with particularity in the claims annexed to and forming part of this specification. For a better understanding of the invention, its advantages, and the specific objects obtained with its use, reference should be had to the accompanying drawings and descriptive matter in which there is illustrated and described a preferred embodiment of this invention.

Figure 1:
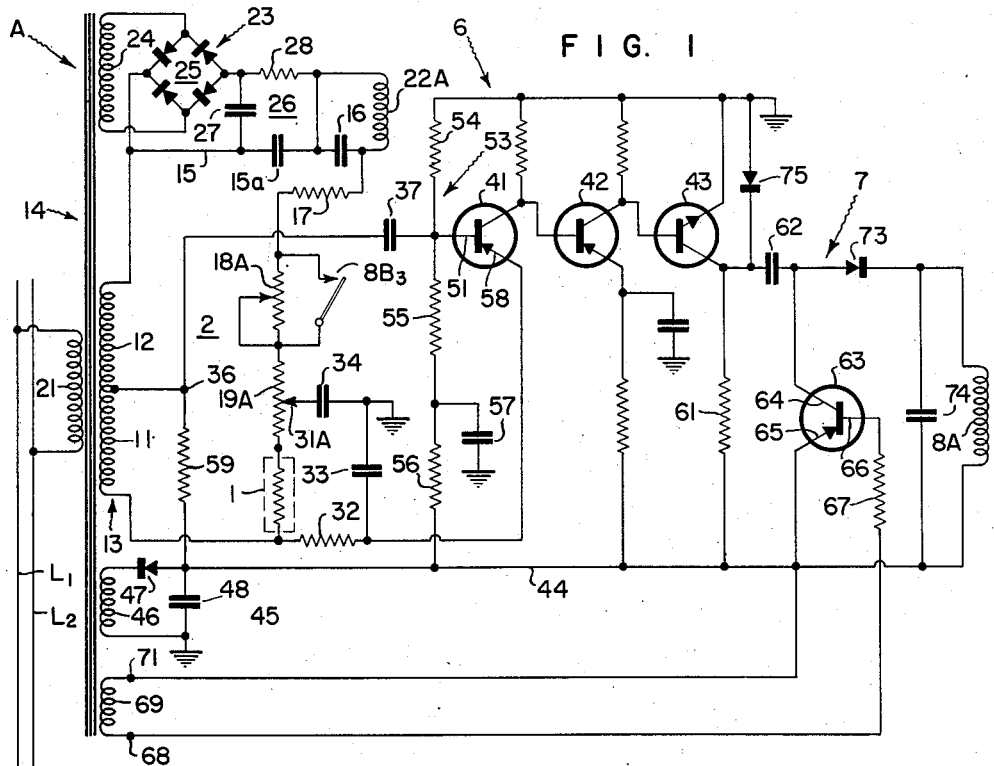
Fig. 1 is a circuit diagram of a monitoring apparatus utilizing the bridge circuit of the present invention.
Figure 1:
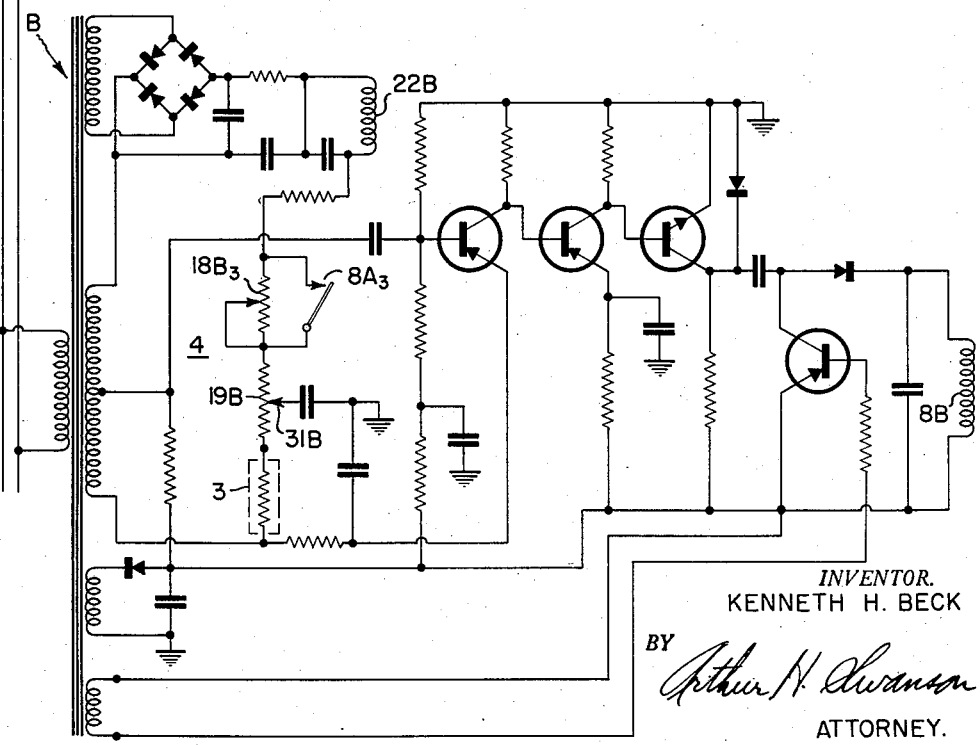

Referring now to Fig. 1, there is shown a circuit diagram of a monitoring apparatus adapted to monitor a temperature and to perform a control function upon the occurrence of a predetermined high temperature. A typical application for a monitor of this type is the monitoring of the temperature of a bearing in a piece of rotating machinery. This monitor employs two identical monitoring channels, A and B, to monitor the same temperature. Both of these channels employ a thermistor connected as an arm of the bridge circuit of the present invention as a temperature sensing element. Channel A employs a thermistor 1 connected as an arm of a bridge circuit 2 for its temperature sensing element, and similarly, channel B employs a thermistor 3 connected as an arm of the bridge circuit 4 as its temperature sensing element. In operation, the thermistors 1 and 3 are positioned with respect to the process or apparatus being monitored, in such a way that they will both respond to the temperature of interest. Since channels A and B are identical in construction and operation, the discussion which follows will be confined, with the exception of the channel interconnections and cross checking features, to the construction and operation of channel A.

As shown, the output of the bridge circuit 2 of channel A is connected to the input of a three-stage transistor amplifier generally designated as 6. The amplifier 6 amplifies the output of the bridge circuit 2 and applies it to the input of a transistor discriminator 7 which is operative to control the operation of a relay 8A. In addition to the thermistor 1, the bridge circuit 2 comprises a pair of winding sections 11 and 12 of a secondary winding 13 of a transformer 14, a conductor 15, a capacitor 15A, a capacitor 16, a resistor 17, and an adjustable resistor 18A, and an adjustable set point resistor 19A. The bridge circuit 2 is energized by means of the secondary winding 13 of the transformer 14 which has a primary winding 21 connected across a suitable source of alternating current, shown here as the conductors $L_1$ and $L_2$.

As will be explained in more detail later, the bridge circuit 2 has been designed to provide safe failure operation upon the occurrence of a failure of any of the components of the bridge circuit. To this end, a relay 22 has been provided to cause safe failure in the event of an open circuit in the thermistor 1. The relay 22 is energized from a source of direct current 23 which comprises a secondary winding 24 of the transformer 14, a full wave bridge rectifier 25, and a filter 26. The filter 26 includes a capacitor 27 and a resistor 28.

The adjustment of a sliding contact 31A on the set point resistor 19A determines the temperature of the thermistor 1 at which the bridge circuit 2 will have a null. A resistor 32 shunts the thermistor 1 through the capacitors 33 and 34 and thus linearizes the bridge sensitivity over its operating range. The phase of the bridge output signal will change by 180° across the bridge null and therefore, the phase of that signal will indicate a high or low temperature with respect to the set point. The output of the bridge circuit 2 is taken across the sliding contact 31A of the set point resistor 19A and a junction 36 of the secondary winding sections 11 and 12.

The output of the bridge circuit 2 is coupled by means of a capacitor 37 to the input of the amplifier 6. The amplifier 6 employs the transistors 41, 42, and 43 as its amplifying elements. The first two stages of the amplifier 6 are conventional direct coupled amplifier stages with pnp junction transistors. The third stage is a conventional direct coupled npn junction transistor stage. The amplifier 6 is energized through a conductor 44 from a direct current power supply 45 which comprises a transformer secondary winding 46, a rectifier 47, and a filtering capacitor 48. The base 51 of the transistor 41 is connected to a base stabilizing voltage divider 53 comprising a pair of resistors 54 and 55 connected in series. The voltage divider 53 is connected to the power supply 45 by means of an additional filtering section comprising a resistor 56 and a capacitor 57.

To provide an added safe failure characteristic, the thermistor shunting resistor 32 has been connected in the emit-circuit of the transistor 41 of the first amplifier stage. The emitter circuit of the transistor 41 can be traced from the emitter 58 through the resistor 32, the transformer secondary winding section 11, and a resistor 59 to the power supply 45. The capacitor 33, in addition to connecting the shunting resistor 32 across the thermistor 1, bypasses the resistor 32 to ground and thereby prevents degeneration across the resistor 32. The safe failure characteristics of this circuitry will be explained in greater detail hereinafter.

The output of the amplifier 6 appears across a resistor 61 in the emitter circuit of the transistor 43. The signal appearing across the resistor 61 is coupled to the input of the phase discriminator 7 by means of the capacitor 62. The phase discriminator 7 employs a pnp junction transistor 63 as a synchronous switch. The collector 64 of the transistor 63 is connected to one terminal of the resistor 61 by a capacitor 62 and the emitter 65 of the transistor 63 is connected to the other terminal of the resistor 61. The base 66 of the transistor 63 is connected by means of a resistor 67 to one end terminal 68 of the secondary winding 69 of the transformer 14. The other end terminal 71 of the transformer secondary winding 69 is connected to the emitter 65 of the transistor 63. The resistor 67 limits the base current drawn by the transistor 63.

The voltage across the secondary winding 69 controls the switching action of the transistor 63. A diode 73 is connected in series to the control relay 8A across the emitter-collector circuit of the transistor 63. The control relay 8A is a polarized relay designed for energization only when current flows in the low impedance direction of the diode 73. The diode 73 is included in the circuit to provide additional safe failing characteristics and to permit a capacitor 74 to be connected in shunt across the control relay 8A to prevent relay chatter. It should be noted, that in other applications or where a different type of load is employed the diode 73 could be eliminated. As shown, a Zener diode 75 is connected across the emitter-collector circuit of the transistor 43 in the last stage of the amplifier 6. This diode prevents the voltage across the emitter-collector circuit of the transistor 43, which is developed as a result of the switching action of the transistor 63, from exceeding the permitted voltage ratings of that transistor.

Figure 2:
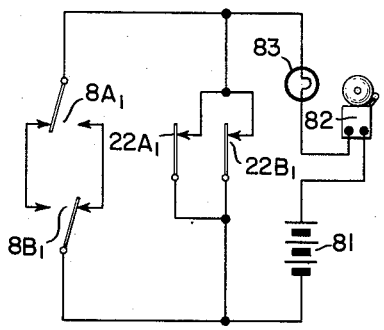
Fig. 2 is a circuit diagram of the alarm circuit employed in the monitor shown in Fig. 1.

Referring now to Fig. 2, there is shown a circuit diagram of the alarm circuit employed in monitor of Fig. 1. All relay contacts are shown in their deenergized positions. As mentioned previously, channel B is identical in construction to channel A and accordingly includes control relay 8B and an open thermistor sensing relay 22B. As shown, the alarm circuit includes a source of alarm energizing current, shown here as a battery 81, an audible alarm means, shown here as a bell 82, and a visual alarm means, shown here as a lamp 83. In the operation of the monitor of Fig. 1, all of the relays associated therewith are energized under normal operating conditions. Accordingly, the contacts associated with these relays are open when the relays are energized.

The alarm circuit has been arranged so that the bell 82 and lamp 83 will be energized upon the deenergization of the open thermistor detection relay of either channel. Accordingly, the contact $22A_1$ of the open thermistor detection relay 22A of channel A and the contact $22B_1$ of the open thermistor detection relay 22B of channel B are connected in parallel across the series connected battery 81, bell 82, and lamp 83. In addition, the deenergization of either of the monitoring channel control relays will cause deenergization of the alarm circuit. To this end, the contact $8A_1$ of the control relay 8A of channel A and the contact $8B_1$ of the control relay 8B of channel B are interconnected as shown so that the deenergization of either control relay without the simultaneous deenergization of the other control relay will cause energization of the alarm means.

Figure 3:
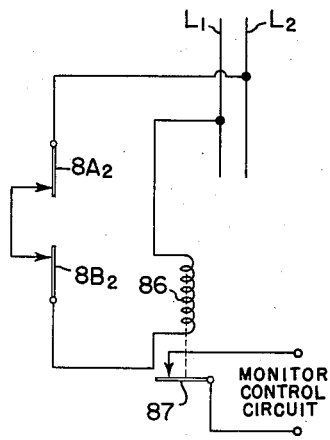
Fig. 3 is a circuit diagram of the control circuit employed in the monitor shown in Fig. 1.

Referring now to Fig. 3, there is shown a circuit diagram of the control circuit of the present invention. Again, all relay contacts have been shown in their deenergized positions. This circuit utilizes a relay 86 having a pair of contacts 87 to perform the monitor control operation. As shown, the coil of the relay 86 is connected across an appropriate source of alternating current, shown here as the conductors $L_1$ and $L_2$, through the contacts $8A_2$ and $8B_2$ of the channel control relays 8A and 8B respectively. It should be noted, that the contacts $8A_2$ and $8B_2$ are in series and that both contacts must be closed before the monitor control relay 86 is energized.

In addition to the contacts just described, each of the channel control relays has an additional set of contacts which are employed to connect to the bridge circuit of the other channel a small resistor which tends to lower the set point of that bridge a few degrees. To this end, the control relay 8B of channel B has a set of contacts $8B_3$ connected across the resistor 18A in the bridge circuit 2 of channel A. Similarly, the control relay 8A of channel A has a set of contacts $8A_3$ connected across the resistor 18B in the bridge circuit 4 of channel B. When the control relays are energized, the resistors 18A and 18B are shorted out of their respective bridge circuits through these contacts. However, when the relays are deenergized, these resistances are connected into their respective bridge circuits and are positioned in the bridge circuits in such a manner as to lower the bridge set point by an amount proportional to the relationship their resistance value bears to the other bridge parameters.

The monitor of Fig. 1 has been designed to provide almost complete safe failing characteristics. To this end, a cross channel check is provided. The channel control relays 8A and 8B are normally energized when the thermistors 1 and 3 indicate a temperature below the set point. As the temperature being monitored approaches the set point temperature, either relay 8A or 8B will be deenergized before the other due to small differences in the circuit elements. Assume that the relay 8A is deenergized first. Circuit operation is the same for either relay 8A or 8B being deenergized first.

When the relay 8A is deenergized, the contacts $8A_1$ will transfer giving an alarm, the contacts $8A_2$ will close but will not energize the main control relay because the contacts $8B_2$ are still open, and the contacts $8A_3$ will open lowering the set point of the bridge 4 of channel B. The shift in the set point of the bridge 4 of channel B will cause the channel control relay 8B to be deenergized. When the channel control relay 8B is deenergized, the contacts $8B_1$ will transfer opening the alarm circuit, contacts $8B_2$ will close energizing the main control relay, and the contacts $8B_3$ will open lowering the set point of the bridge circuit 2 of channel A. If the temperatures of the thermistors 1 and 3 go above the set point temperature, the channel control relays 8A and 8B will remain deenergized. If after the relay 8A is deenergized and the relay 8B fails to deenergize, the main control relay will not be energized and a continuous alarm will be signalled.

In considering the operation of the monitor of Fig. 1, it should be noted that the adjustment of the sliding contact 31A on the set point resistor 19A in the bridge circuit 2 of channel A determines the temperature at which the thermistor 1 will cause the bridge circuit 2 to have a null. Similarly, the adjustment of the sliding contact 31B on the set point resistor 19B of the bridge circuit 4 of channel B will determine the temperature at which the thermistor 3 will cause the bridge circuit 4 to have a null. In most applications, the set points of the two bridges will be identical, and accordingly the set point adjustments of these bridges may be ganged.

In operation, the phase of the bridge output voltage of both channels is such as to maintain the control relays associated therewith energized until the bridge set point is exceeded. Accordingly, a malfunction of the bridge, amplifier, or phase discriminator, causing a loss of the bridge output signal will cause the relay associated therewith to be deenergized and due to the cross-channel check to be indicated by an alarm. The resistance of the thermistor temperature sensing element decreases with increasing temperature, and the phase of the bridge output voltage changes by 180° as the bridge set point is passed. The monitor shown in Fig. 1 is arranged to detect a high temperature and therefore the phase of the bridge output voltage of both channels is arranged with respect to the phase discriminator reference voltage to maintain the control relay energized until the resistance of the thermistor decreases to a value which causes phase reversal.

Figure 4:
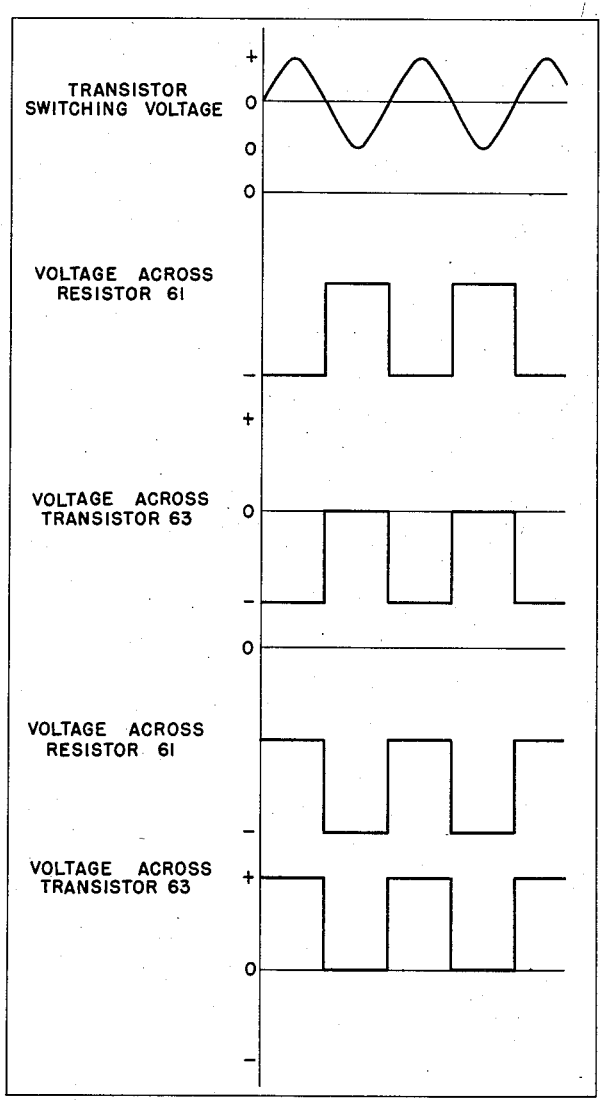
Fig. 4 is a table showing the phase relationships of the voltages appearing across various sections of the phase discriminator employed in the monitor shown in Fig. 1.

In considering the operation of the phase discriminator employed in the monitor of Fig. 1, reference should be had to Fig. 4 which is a table showing the phase relations of the voltages across various parts of that circuit. The output of the amplifier 6 appears across the resistor 61 in the collector circuit of the transistor 43 in the last amplifier stage. Due to the gain and the limiting action of the amplifier 6, the transistor 43 is driven in such a manner that it can be considered to be a switch causing a square wave output to be produced across the resistor 61 as it is alternately driven conductive and non-conductive. For the purpose of this explanation, the voltage level of the conductor 44 has been taken as the reference voltage. As shown in Fig. 4, the collector of the transistor 43 goes highly negative as the transistor 43 conducts and returns to a less negative value, determined by the breakdown voltage of the Zener diode 75, when the transistor 43 is non-conductive. The phase of the resulting negative pulses with respect to the switching voltage applied to the emitter-base circuit of the transistor 63 of the phase discriminator 7, controls the operation of the relay 8A.

The transistor 63 is operated as a synchronous switch. When the base 66 is negative with respect to the emitter 65, the transistor may be considered to be a closed switch with a very low voltage drop between the collector and emitter terminals. When the base 66 is positive with respect to the emitter 65, the transistor 63 can be considered to be an open switch with very low leakage between the collector and emitter terminals. During the half cycle of the transistor switching voltage that the transistor 63 can be considered to be a closed switch, the capacitor 62 is connected directly across the resistor 61 and is charged to the voltage appearing across that resistor. Accordingly, if the phase of the amplifier output voltage with respect to the phase discriminator switching voltage is such that the transistor 63 is a closed switch during the half cycle that the transistor 43 is non-conductive, the capacitor 62 is charged to the voltage appearing across the resistor 61 due to the current flow through the Zener diode 75. During the next half cycle, when the transistor 63 is an open switch and the transistor 43 is conductive, the charge on the capacitor 62 subtracts from the voltage developed across the resistor 61 leaving a net voltage across the emitter collector circuit of the transistor 63 of such a polarity that current would flow through the relay 8A if it were not for the diode 73.

When, however, the phase of the amplifier output voltage with respect to the phase discriminator switching voltage is such that the transistor 63 is a closed switch during the half cycle that the transistor 43 is non-conductive, the capacitor 62 is charged to the voltage appearing across the resistor 61 due to the current flow through the transistor 43. During the next half cycle, when the transistor 63 is an open switch and the transistor 43 is non-conductive, the voltage developed across the resistor 61, due to the current flow through the Zener diode 75, subtracts from the voltage across the capacitor 62 leaving a net voltage of such a polarity that the condenser 62 is discharged through the relay 8A. Accordingly, when this phase relationship exists, the relay 8A is energized with pulses of positive current. The relay 8A is polarized and will be energized only on such positive current pulses. The diode 73 in series with the relay 8A allows an integrating capacitor 74 to be placed across the relay 8A to prevent relay chatter.

The bridge circuits employed in the monitor of Fig. 1 have been designed to provide safe failure upon the failure of as many components as possible. To this end, two separate D. C. paths have been included in the bridge circuit. The first of these is energized by the power supply 23 and includes the relay 22A, the resistor 17, the resistor 18A, the set point resistor 19A, the thermistor 1, and the secondary winding sections 11 and 12 of the transformer 14. Any opening in this path will cause the deenergization of the open thermistor detection relay 22A causing an alarm to be signalled. The second of the D. C. paths is the D. C. energization path for the transistor 41 of the first amplifier stage. This path includes the resistor 32, employed to shunt the thermistor 1, the secondary winding section 11 of the transformer 14 and the resistor 59. Any opening in this D. C. path will cause the transistor 41 to lose its operating bias and accordingly the deenergization of the channel control relay 8A. It should be noted that two separate D. C. paths are required because of the shunt 32 employed to linearize the characteristics of the thermistor 1. It also should be noted, that the capacitors 15A, 16, 33, and 34 prevent the D. C. current flowing through the thermistor 1 from flowing in the shunting resistor 32 as well as preventing the D. C. current flowing in the shunting resistor 32 from flowing in the thermistor 1. This circuitry permits the detection of a failure of one of these elements not necessarily accompanied by a failure of the other element.

The kinds of failure considered in this discussion are either open or short circuits of the components. The safe failure is defined here as a failure which will produce either no signal at the output of the first amplifier stage or a large signal of the same phase as would be produced by the heating of the thermistor to a temperature above that corresponding to the bridge set point. Signals of this phase cause the phase discriminator relay to be deenergized.

The output signal of the bridge circuit 2 is taken across the bridge circuit between the tap 36 on the transformer secondary winding 13 and the sliding contact 31A on the set point resistor 19A which latter point is connected to ground through the capacitor 34.

The bridge is so adjusted that its output goes to a null when the resistance of the thermistor assumes a specific value corresponding to the maximum safe temperture of the process or apparatus being monitored. A further decrease in thermistor resistance will produce a bridge output signal of a phase which represents a "hot" or unsafe condition. Similarly, a value of thermistor resistance greater than that producing a null will produce a bridge output signal of a phase which represents a "cold" or safe condition.

The following is a table itemizing the most probable bridge component failures and the result of these failures. It should be noted that all of these failures are safe failures.

| Component | Failure | Result |
|---|---|---|
| Capacitor 27 | short | Will short D. C. open thermistor detection relay supply voltage and relay will deenergize signaling an alarm. |
| | open | D. C. voltage for open thermistor detection relay will be reduced. The relay will deenergize for low thermistor temperatures. |
| Capacitor 15a | short | The relay 22A will lose D. C. energization. |
| | open | Resistor 28 will now be part of A. C. bridge and will cause a high temperature signal thereby deenergizing the output relay. |
| Resistor 28 | open | This will open the D. C path through the relay 22A, deenergizing that relay. |
| | short | This D. C. bridge voltage will increase, this will raise the temperature of the thermistors, therefore, this channel will trip before the other channel. |
| Capacitor 16 | short | The relay 22A will be deenergized. |
| | open | The impedance of the relay 22A will be in the A. C. bridge, causing a high temperature signal deenergizing the output relay. |
| Capacitor 37 | open | No signal to the amplifier. |
| | short | The base 51 of transistor 41 tries to become more positive than the emitter 58 and the first stage is cut off blocking the signal to following stages. |
| Capacitor 34 | short | The grounding of the bridge makes the emitter 58 of the transistor 41 negative causing the first amplifier stage to cut off. |
| | open | No signal to amplifiers. |
| | short | Emitter 58 of the transistor 41 grounded, cutting off the first amplifier stage. |
| Capacitor 33 | open | A "hot" signal applied to amplifiers causing deenergization of channel control relay. |
| Resistor 32, Resistor 59, and Winding 11. | open | Opens D. C. emitter current return path causing first stage to be nonoperative. |
| Resistor 17, Resistor 18A, and Winding 12. | do | Removes "cold" signal source and provides a full "hot" signal to amplifier causing relay deenergization. |
| Any opening in the D. C. bridge current path including Resistors 17, 18A, 19A, Thermistor 1, Windings 11 and 12, Rectifier 25 and Resistor 28. | | Causes deenergization of open thermistor detection relay 22A. |
| Thermistor 1 | Ground on either side. | Makes emitter of transistor 51 too negative causing the first amplifier stage to cut off. |

Subject matter disclosed but not claimed herein is being disclosed and claimed in the copending application of Thomas A. Patchell and Robert Mayer, Serial No. 565,399, and the copending application of Alan I. Frank, Serial No. 565,400, filed on even date herewith and assigned to the same assignee.

While, in accordance with the provisions of the statutes, there has been illustrated and described the best form of the embodiments of the invention now known, it will be apparent to those skilled in the art that changes may be made in the form of the apparatus disclosed without departing from the spirit of the invention as set forth in the appended claims and that in some instances certain features of the invention may be used to advantage without a corresponding use of other features.

Having described this invention, that which is claimed as new and which it is desired to secure by Letters Patent is:

1. In combination, a first and a second element connected in parallel, means for establishing in said first and second elements a current flow of one character, means for establishing in said first element a second current of a different character from said first current, and means for detecting a change in said second current upon a failure of said first element not necessarily accompanied by a failure of said second element.

2. In combination, a circuit having a first and second element connected in parallel, means for establishing in said first and second elements a current flow of one character, means for establishing in said first element a second current flow of a different character, means for detecting a change in said second current flow upon a failure of said first element, means for establishing in said second element a current flow of a different character from said first current flow, and means for detecting a change in said last named current flow upon a failure of said second element.

3. In combination, a circuit having a first and a second element connected in parallel, means for establishing in said circuit a first current flow of one character, means for establishing in said first element a second current flow of a different character from said first current flow, means connected in series with said second element for preventing said second current from flowing in said second element, and means for detecting a change in said second current upon a failure of said first element.

4. In combination, a circuit having a first and a second element connected in parallel, means for establishing in said first and second elements a first current flow of one character, means for establishing in said first element a second current flow of a different character from said first current flow, means connected in series with said second element to prevent said second current from flowing therein, means for detecting a change in said second current upon a failure of said first element, means for establishing in said second element a second current flow of a different character than said first current flow, means connected in series with said first element to prevent said last named current from flowing therein, and means for detecting a change in said second current flow in said second element upon a failure of said second element.

5. In combination with an alternating current bridge circuit having for one of its arms a condition sensitive resistor, an A. C. path shunting said condition sensitive resistor and including a linearizing resistor, a first D. C. path including said condition sensitive resistor and substantially all of said bridge circuit means connected in said first D. C. path and operative to be deenergized upon an opening in said path, a second D. C. path including said linearizing resistor, and means connected in said second D. C. path and operative to be deenergized upon an opening in said path.

6. In combination, an electrical bridge circuit energized from an alternating current source, said bridge circuit having for one of its arms a condition sensitive element, an alternating current path shunting said element, said path including a resistor, an amplifier connected to the output of said bridge circuit, direct current energizing source for said amplifier, means including said shunt resistor connecting said amplifier to said source, a second direct current source, and control means, said control means being energized from said second direct current source through a path including said condition sensitive element.

7. In a safe failing measuring or control apparatus, an alternating current bridge circuit having for one of its arms a condition sensitive element, means shunting said element to shape the response of said element, a source of direct current, a direct current path including substantially all of said bridge circuit including said condition sensitive element, means responsive to said direct current for sensing a failure in said direct current path, amplifying means connected to the output of said bridge circuit, and means connecting said shunt in circuit with said amplifier to render said amplifier inoperative upon the failure of said shunt.

8. In combination, a circuit having a first element shunted by a second element, said circuit normally having a first current flow therein of one character, means for establishing in said circuit a second current flow of a different character than said first current, means for detecting a change in said second current upon a failure of said first element not necessarily accompanied by a failure of said second element, means for establishing in said circuit a third current flow having a different character than said first current, and means for detecting a change in said third current flow upon a failure of said second element not necessarily accompanied by a failure of said first element.

9. In combination, a circuit having a first element shunted by a second element, said circuit normally having a current flow therein of one character, means for establishing in said circuit a second current flow of a different character, and means to detect a change in said second current upon a failure of said shunted element not necessarily accompanied by a failure of said second element.

10. In combination, an electrical bridge circuit having a measuring element shunted by another circuit element, means for energizing said bridge circuit with an alternating current, means for establishing in said measuring element and substantially all of said bridge circuit a direct current, and means for detecting a change in said direct current upon a failure of said measuring element not accompanied by a failure of said second circuit element.

11. In combination, a circuit having a first and a second element connected in parallel, means for establishing a first current flow in said elements of one character, means connected to said circuit to detect a change in said first current flow, means for establishing in said first element a second current flow of a different character, means interconnecting said first element and said detection means to cause said detection means to fail upon a failure of said first element.

12. In combination, a bridge circuit having a measuring element with a shunt connecting in parallel therewith, means for establishing in said measuring element and said shunt a first current flow of one character, means connected to said bridge circuit for determining a change in said first current flow, means for establishing in said measuring element a second current flow of a different character from said first current flow, means connected in series with said shunt to prevent said second current from flowing therein, means for detecting a change in said second current flow upon a failure of said measuring element, means for establishing in said shunt a second current flow of a different character than said first current flow, means connected in series with said measuring element to prevent said last named current from flowing therein, means interconnecting said shunt and said means for detecting a change in said first current flow to cause said means to detect a change in said second current flowing in said shunt upon a failure of said shunt.

References Cited in the file of this patent

UNITED STATES PATENTS

| | | |
|---|---|---|
| 2,302,061 | Schirm | Nov. 17, 1942 |
| 2,423,541 | Wilson et al. | July 8, 1947 |
| 2,684,475 | Lode | July 20, 1954 |
| 2,690,477 | Friedmann et al. | Sept. 28, 1954 |
| 2,691,889 | Dion et al. | Oct. 19, 1954 |
| 2,695,994 | Lode | Nov. 30, 1954 |
| 2,728,904 | Schafer | Dec. 27, 1955 |